(12) United States Patent
Murotani et al.

(10) Patent No.: US 8,510,526 B2
(45) Date of Patent: Aug. 13, 2013

(54) STORAGE APPARATUS AND SNAPSHOT CONTROL METHOD OF THE SAME

(75) Inventors: Akira Murotani, Odawara (JP); Katsumi Hirezaki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 532 days.

(21) Appl. No.: 12/811,401

(22) PCT Filed: Jan. 29, 2010

(86) PCT No.: PCT/JP2010/000560
§ 371 (c)(1),
(2), (4) Date: Jul. 1, 2010

(87) PCT Pub. No.: WO2011/033692
PCT Pub. Date: Mar. 24, 2011

(65) Prior Publication Data
US 2011/0238937 A1    Sep. 29, 2011

(30) Foreign Application Priority Data
Sep. 17, 2009   (JP) ................................. 2009-216147

(51) Int. Cl.
*G06F 12/00*    (2006.01)
(52) U.S. Cl.
USPC ....................................................... 711/162
(58) Field of Classification Search
None
See application file for complete search history.

(56) References Cited

U.S. PATENT DOCUMENTS

| 6,934,822 B2 * | 8/2005 | Armangau et al. ........... 711/162 |
| 2005/0027819 A1 | 2/2005 | Nakano et al. |
| 2005/0216535 A1 | 9/2005 | Saika et al. |
| 2007/0204119 A1 | 8/2007 | Murotani et al. |

FOREIGN PATENT DOCUMENTS

| JP | 11-120055 | 4/1999 |
| JP | 2004-342050 | 12/2004 |
| JP | 2005-284609 | 10/2005 |
| JP | 2005-332067 | 12/2005 |
| JP | 2007-140746 | 6/2007 |
| JP | 2007-213345 | 8/2007 |
| JP | 2007-226596 | 9/2007 |
| JP | 2007-280323 | 10/2007 |
| JP | 2008-015768 | 1/2008 |
| JP | 2009-020914 | 1/2009 |

* cited by examiner

*Primary Examiner* — Brian Peugh
(74) *Attorney, Agent, or Firm* — Brundidge & Stanger, P.C.

(57) ABSTRACT

[Problem] Providing a storage apparatus and a snapshot control method for the same for preventing, even after long-term operation of snapshots as a means for backup, an increase in the amount of pre-update data retained in a differential volume.

[Solution] According to this invention, snapshots utilizing pre-update data are replaced with snapshots utilizing update data so that the areas, in the differential volume, storing the pre-update data are released as free areas correspondingly, thereby avoiding accumulation of the pre-update data in the differential volume.

12 Claims, 22 Drawing Sheets

FIG. 5

| BLOCK ADDRESS 511 | CoW BITMAP 512 | VIRTUAL VOLUME 1 513 | VIRTUAL VOLUME 2 514 | ... | VIRTUAL VOLUME N 515 | |
|---|---|---|---|---|---|---|
| 0 | 0 0 ... 0 | 0 | 0 | ... | 0 | ~501 |
| 1 | 0 0 ... 0 | 1 | 2 | ... | 3 | ~502 |
| 2 | 1 0 ... 0 | NONE | 4 | ... | 4 | ~503 |
| : | : | : | : | ... | : | |
| m-1 | 1 1 ... 1 | NONE | NONE | ... | NONE | ~504 | b-1 b-2 b-n

FIG. 8

| V-VOL V3 | V-VOL V4 | V-VOL V5 | V-VOL V6 |
|---|---|---|---|
| RRR | FFF | FFF | DDD |

FIG.6A

| BLOCK ADDRESS | CoW BITMAP | | VIRTUAL VOLUME V3 |
|---|---|---|---|
| | b-1 | | |
| 0 | 1 | | NONE |
| 1 | 1 | | NONE |
| 2 | 1 | | NONE |
| 3 | 1 | | NONE |
| 4 | 1 | | NONE |
| 5 | 1 | | NONE |
| 6 | 1 | | NONE |
| 7 | 1 | | NONE |
| 8 | 1 | | NONE |
| 9 | 1 | | NONE |
| 10 | 1 | | NONE |
| 11 | 1 | | NONE |
| 12 | 1 | | NONE |
| 13 | 1 | | NONE |
| 14 | 1 | | NONE |
| 15 | 1 | | NONE |

FIG.6B

| BLOCK ADDRESS | CoW BITMAP | | VIRTUAL VOLUME V3 |
|---|---|---|---|
| | b-1 | | |
| 0 | 1 | | NONE |
| 1 | 1 | | NONE |
| 2 | 1 | | NONE |
| 3 | 0 | | 20 |
| 4 | 1 | | NONE |
| 5 | 1 | | NONE |
| 6 | 1 | | NONE |
| 7 | 1 | | NONE |
| 8 | 1 | | NONE |
| 9 | 1 | | NONE |
| 10 | 1 | | NONE |
| 11 | 1 | | NONE |
| 12 | 1 | | NONE |
| 13 | 1 | | NONE |
| 14 | 1 | | NONE |
| 15 | 1 | | NONE |

FIG. 6C

| BLOCK ADDRESS | CoW BITMAP | | VIRTUAL VOLUME V3 |
|---|---|---|---|
| | b−1 | | |
| 0 | 1 | | NONE |
| 1 | 1 | | NONE |
| 2 | 1 | | NONE |
| 3 | 0 | | 20 |
| 4 | 1 | | NONE |
| 5 | 1 | | NONE |
| 6 | 1 | | NONE |
| 7 | 1 | | NONE |
| 8 | 1 | | NONE |
| 9 | 1 | | NONE |
| 10 | 1 | | NONE |
| 11 | 1 | | NONE |
| 12 | 0 | | 21 |
| 13 | 1 | | NONE |
| 14 | 1 | | NONE |
| 15 | 1 | | NONE |

FIG.6D

| BLOCK ADDRESS | CoW BITMAP | | VIRTUAL VOLUME V3 | VIRTUAL VOLUME V4 |
|---|---|---|---|---|
| | b-1 | b-2 | | |
| 0 | 1 | 1 | NONE | NONE |
| 1 | 1 | 1 | NONE | NONE |
| 2 | 1 | 1 | NONE | NONE |
| 3 | 0 | 1 | 20 | NONE |
| 4 | 1 | 1 | NONE | NONE |
| 5 | 1 | 1 | NONE | NONE |
| 6 | 1 | 1 | NONE | NONE |
| 7 | 1 | 1 | NONE | NONE |
| 8 | 1 | 1 | NONE | NONE |
| 9 | 1 | 1 | NONE | NONE |
| 10 | 1 | 1 | NONE | NONE |
| 11 | 1 | 1 | NONE | NONE |
| 12 | 0 | 1 | 21 | NONE |
| 13 | 1 | 1 | NONE | NONE |
| 14 | 1 | 1 | NONE | NONE |
| 15 | 1 | 1 | NONE | NONE |

FIG.6E

| BLOCK ADDRESS | CoW BITMAP | | VIRTUAL VOLUME V3 | VIRTUAL VOLUME V4 |
|---|---|---|---|---|
| | b-1 | b-2 | | |
| 0 | 1 | 1 | NONE | NONE |
| 1 | 0 | 0 | 22 | 22 |
| 2 | 1 | 1 | NONE | NONE |
| 3 | 0 | 1 | 20 | NONE |
| 4 | 1 | 1 | NONE | NONE |
| 5 | 1 | 1 | NONE | NONE |
| 6 | 1 | 1 | NONE | NONE |
| 7 | 1 | 1 | NONE | NONE |
| 8 | 1 | 1 | NONE | NONE |
| 9 | 1 | 1 | NONE | NONE |
| 10 | 1 | 1 | NONE | NONE |
| 11 | 1 | 1 | NONE | NONE |
| 12 | 0 | 1 | 21 | NONE |
| 13 | 1 | 1 | NONE | NONE |
| 14 | 1 | 1 | NONE | NONE |
| 15 | 1 | 1 | NONE | NONE |

FIG.6F

| BLOCK ADDRESS | CoW BITMAP | | VIRTUAL VOLUME V3 | VIRTUAL VOLUME V4 |
|---|---|---|---|---|
| | b-1 | b-2 | | |
| 0 | 1 | 1 | NONE | NONE |
| 1 | 0 | 0 | 22 | 22 |
| 2 | 1 | 1 | NONE | NONE |
| 3 | 0 | 0 | 20 | 23 |
| 4 | 1 | 1 | NONE | NONE |
| 5 | 1 | 1 | NONE | NONE |
| 6 | 1 | 1 | NONE | NONE |
| 7 | 1 | 1 | NONE | NONE |
| 8 | 1 | 1 | NONE | NONE |
| 9 | 1 | 1 | NONE | NONE |
| 10 | 1 | 1 | NONE | NONE |
| 11 | 1 | 1 | NONE | NONE |
| 12 | 0 | 1 | 21 | NONE |
| 13 | 1 | 1 | NONE | NONE |
| 14 | 1 | 1 | NONE | NONE |
| 15 | 1 | 1 | NONE | NONE |

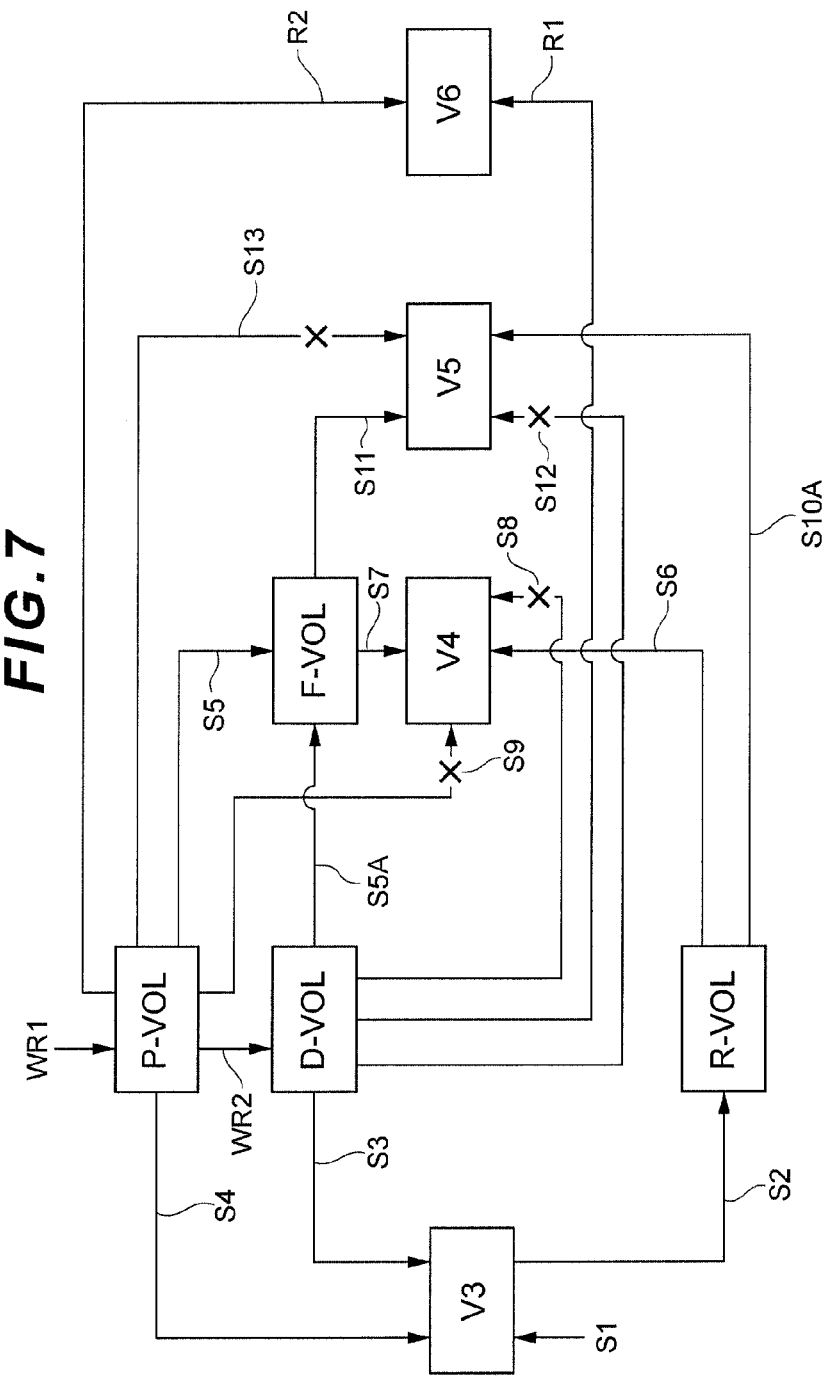

FIG.11

| BLOCK ADDRESS | CoW BITMAP | | | | VIRTUAL VOLUME V3 | VIRTUAL VOLUME V4 | VIRTUAL VOLUME V5 | VIRTUAL VOLUME V6 |
|---|---|---|---|---|---|---|---|---|
| | b-1 | b-2 | b-3 | b-4 | | | | |
| 0 | 1 | 1 | 1 | 1 | NONE | NONE | NONE | NONE |
| 1 | 0 | 0 | 0 | 0 | 22 | 22 | 26 | 28 |
| 2 | 1 | 1 | 1 | 1 | NONE | NONE | NONE | NONE |
| 3 | 0 | 0 | 0 | 0 | 20 | 23 | 24 | 29 |
| 4 | 1 | 1 | 1 | 1 | NONE | NONE | NONE | NONE |
| 5 | 1 | 1 | 1 | 1 | NONE | NONE | NONE | NONE |
| 6 | 0 | 0 | 0 | 0 | 25 | 25 | 25 | 30 |
| 7 | 1 | 1 | 1 | 1 | NONE | NONE | NONE | NONE |
| 8 | 1 | 1 | 1 | 1 | NONE | NONE | NONE | NONE |
| 9 | 1 | 1 | 1 | 1 | NONE | NONE | NONE | NONE |
| 10 | 1 | 1 | 1 | 1 | NONE | NONE | NONE | NONE |
| 11 | 1 | 1 | 1 | 1 | NONE | NONE | NONE | NONE |
| 12 | 0 | 1 | 1 | 1 | 21 | NONE | NONE | NONE |
| 13 | 1 | 1 | 1 | 1 | NONE | NONE | NONE | NONE |
| 14 | 0 | 0 | 0 | 0 | 31 | 31 | 31 | 31 |
| 15 | 0 | 0 | 0 | 0 | 27 | 27 | 27 | 32 |

FIG.12

| BLOCK ADDRESS | CoW BITMAP | | | R-VOL (VIRTUAL VOLUME V3) | VIRTUAL VOLUME V4 (UTILIZING F-VOL) | VIRTUAL VOLUME V5 (UTILIZING F-VOL) |
|---|---|---|---|---|---|---|
| | b-1 | b-2 | b-3 | | | |
| 0 | — | 1 | 1 | — | NONE | NONE |
| 1 | — | 1 | 0 | — | NONE | 66 |
| 2 | — | 1 | 1 | — | NONE | NONE |
| 3 | — | 0 | 0 | — | 63 | 67 |
| 4 | — | 1 | 1 | — | NONE | NONE |
| 5 | — | 1 | 1 | — | NONE | NONE |
| 6 | — | 1 | 1 | — | NONE | NONE |
| 7 | — | 1 | 1 | — | NONE | NONE |
| 8 | — | 1 | 1 | — | NONE | NONE |
| 9 | — | 1 | 1 | — | NONE | NONE |
| 10 | — | 1 | 1 | — | NONE | NONE |
| 11 | — | 1 | 1 | — | NONE | NONE |
| 12 | — | 0 | 0 | — | 64 | 64 |
| 13 | — | 1 | 1 | — | NONE | NONE |
| 14 | — | 1 | 1 | — | NONE | NONE |
| 15 | — | 1 | 1 | — | NONE | NONE |

FIG.13

| BLOCK ADDRESS | CoW BITMAP | VIRTUAL VOLUME V6 |
|---|---|---|
| | b-4 | |
| 0 | 1 | NONE |
| 1 | 0 | 28 |
| 2 | 1 | NONE |
| 3 | 0 | 29 |
| 4 | 1 | NONE |
| 5 | 1 | NONE |
| 6 | 0 | 30 |
| 7 | 1 | NONE |
| 8 | 1 | NONE |
| 9 | 1 | NONE |
| 10 | 1 | NONE |
| 11 | 1 | NONE |
| 12 | 1 | NONE |
| 13 | 1 | NONE |
| 14 | 0 | 31 |
| 15 | 0 | 32 |

FIG.14A

| BLOCK ADDRESS | CoW BITMAP | R-VOL (VIRTUAL VOLUME V3) |
|---|---|---|
| | b-1 | |
| 0 | — | — |
| 1 | — | — |
| 2 | — | — |
| 3 | — | — |
| 4 | — | — |
| 5 | — | — |
| 6 | — | — |
| 7 | — | — |
| 8 | — | — |
| 9 | — | — |
| 10 | — | — |
| 11 | — | — |
| 12 | — | — |
| 13 | — | — |
| 14 | — | — |
| 15 | — | — |

FIG.14B

| BLOCK ADDRESS | CoW BITMAP | | | VIRTUAL VOLUME V3 | VIRTUAL VOLUME V4 | VIRTUAL VOLUME V5 |
|---|---|---|---|---|---|---|
| | b-1 | b-2 | b-3 | | | |
| 0 | 1 | 1 | 1 | NONE | NONE | NONE |
| 1 | 0 | 0 | 0 | 22 | 22 | 26 |
| 2 | 1 | 1 | 1 | NONE | NONE | NONE |
| 3 | 0 | 0 | 0 | 20 | 23 | 24 |
| 4 | 1 | 1 | 1 | NONE | NONE | NONE |
| 5 | 1 | 1 | 1 | 25 | 25 | 25 |
| 6 | 0 | 0 | 0 | NONE | NONE | NONE |
| 7 | 1 | 1 | 1 | NONE | NONE | NONE |
| 8 | 1 | 1 | 1 | NONE | NONE | NONE |
| 9 | 1 | 1 | 1 | NONE | NONE | NONE |
| 10 | 1 | 1 | 1 | NONE | NONE | NONE |
| 11 | 0 | 1 | 1 | 21 | NONE | NONE |
| 12 | 1 | 1 | 0 | NONE | NONE | NONE |
| 13 | 0 | 0 | 0 | 31 | 31 | 31 |
| 14 | 0 | 0 | 0 | 27 | 27 | 27 |
| 15 | | | | | | |

500

| | SHIFT TARGET BITMAP FOR V4 (BA1) | SHIFT TARGET BITMAP FOR V5 (BA2) |
|---|---|---|
| | 1 | 1 |
| | 1 | 0 |
| | 1 | 1 |
| | 0 | 0 |
| | 1 | 1 |
| | 1 | 1 |
| | 1 | 1 |
| | 1 | 1 |
| | 1 | 1 |
| | 1 | 1 |
| | 1 | 1 |
| | 0 | 1 |
| | 1 | 1 |
| | 1 | 1 |
| | 1 | 1 |

FIG.14C

| BLOCK ADDRESS | CoW BITMAP | | R-VOL | VIRTUAL VOLUME V4 (UTILIZING F-VOL) |
|---|---|---|---|---|
| | b-1 | b-2 | | |
| 0 | — | 1 | — | NONE |
| 1 | — | 1 | — | NONE |
| 2 | — | 1 | — | NONE |
| 3 | — | 0 | — | 63 |
| 4 | — | 1 | — | NONE |
| 5 | — | 1 | — | NONE |
| 6 | — | 1 | — | NONE |
| 7 | — | 1 | — | NONE |
| 8 | — | 1 | — | NONE |
| 9 | — | 1 | — | NONE |
| 10 | — | 1 | — | NONE |
| 11 | — | 0 | — | 64 |
| 12 | — | 1 | — | NONE |
| 13 | — | 1 | — | NONE |
| 14 | — | 1 | — | NONE |
| 15 | — | 1 | — | NONE |

BA1

| SHIFT TARGET BITMAP FOR V4 |
|---|
| 1 |
| 1 |
| 1 |
| 0 |
| 1 |
| 1 |
| 1 |
| 1 |
| 1 |
| 1 |
| 1 |
| 0 |
| 1 |
| 1 |
| 1 |
| 1 |

FIG. 14D

| BLOCK ADDRESS | CoW BITMAP | | | R-VOL (VIRTUAL VOLUME V3) | VIRTUAL VOLUME V4 (UTILIZING F-VOL) | VIRTUAL VOLUME V5 (UTILIZING F-VOL) | SHIFT TARGET BITMAP FOR V5 |
|---|---|---|---|---|---|---|---|
| | b-1 | b-2 | b-3 | | | | |
| 0 | — | 1 | 1 | — | NONE | NONE | 1 |
| 1 | — | 1 | 0 | — | NONE | 66 | 0 |
| 2 | — | 1 | 1 | — | NONE | NONE | 1 |
| 3 | — | 0 | 0 | — | 63 | 67 | 0 |
| 4 | — | 1 | 1 | — | NONE | NONE | 1 |
| 5 | — | 1 | 1 | — | NONE | NONE | 1 |
| 6 | — | 1 | 1 | — | NONE | NONE | 1 |
| 7 | — | 1 | 1 | — | NONE | NONE | 1 |
| 8 | — | 1 | 1 | — | NONE | NONE | 1 |
| 9 | — | 1 | 1 | — | NONE | NONE | 1 |
| 10 | — | 1 | 0 | — | NONE | NONE | 1 |
| 11 | — | 0 | 1 | — | NONE | NONE | 1 |
| 12 | — | 1 | 1 | — | 64 | 64 | 1 |
| 13 | — | 1 | 1 | — | NONE | NONE | 1 |
| 14 | — | 1 | 1 | — | NONE | NONE | 1 |
| 15 | — | 1 | 1 | — | NONE | NONE | 1 |

STORAGE APPARATUS AND SNAPSHOT CONTROL METHOD OF THE SAME

INCORPORATION BY REFERENCE

The present application relates to International application no. PCT/JP2010/000560 filed on Jan. 29, 2010, which claims priority from Japanese application no. 2009-216147 filed on Sep. 17, 2009, the content of which is hereby incorporated by reference into this application.

TECHNICAL FIELD

This invention relates to a storage apparatus, specifically to a storage apparatus having a function of freezing an-in-use volume at a certain date and time and providing the frozen data image as a snapshot to a user computer. Furthermore, this invention relates to a snapshot control method of the storage apparatus.

BACKGROUND ART

One of the important roles of storage systems accumulating information in the information-oriented society is protection of user data. As a function for protecting user data, a snapshot function is well-known.

The snapshot function refers to the function of freezing an in-use volume at a certain date and time and providing the frozen data image to a user computer such as a host computer. The frozen data image of the volume is called a snapshot. The storage apparatus can provide multiple generations of snapshots to the user.

The snapshot function is for salvaging data from operational mistakes such as a case where the user involuntarily deletes a file.

The user can restore data at the point in time when a snapshot was created by returning to a snapshot of a desired generation such as a previous generation. That is, the snapshot function is for guaranteeing a data image of a volume as of a certain date and time to the user.

A conventional technology disclosing this snapshot function is, for example, described in the Japanese Unexamined Patent Application Publication No. 2004-342050. According to this publication, a file server as a storage apparatus provides a snapshot as a virtual volume to a client computer.

The file server, with reference to a primary volume as an in-use volume to which the client computer continuously accesses and a differential volume storing the data in the primary volume before being updated (pre-update data), provides a snapshot to the user.

If there is a write access from the client computer to the primary volume after the file server acquires a snapshot, the file server reads the pre-update data from the primary volume, writes this [data] to the differential volume, and then, records the update data in the primary volume. Which block of the primary volume was updated is managed with a bitmap.

When the client computer accesses a virtual volume for a snapshot, the file server refers to the bitmap and, in case of an access to the block address with a flag on, because the corresponding area in the primary volume has been updated, the file server reads the pre-update data from the differential volume while, in case of an access to a block address with no flag being set, because the corresponding area in the primary volume has not been updated, it reads the data from the primary volume, and provides the read data to the client computer.

Note that another conventional technology related to this invention is the Japanese Unexamined Patent Application Publication No. 2005-284609 and the Japanese Unexamined Patent Application Publication No. 2007-226596.

CITATION LIST

Patent Literature

[PTL 1] Japanese Unexamined Patent Application Publication No. 2004-342050
[PTL 2] Japanese Unexamined Patent Application Publication No. 2005-284609
[PTL 3] Japanese Unexamined Patent Application Publication No. 2007-226596

SUMMARY OF INVENTION

Technical Problem

Because the snapshot technology by which a user can salvage past files by himself/herself without troubling an administrator can be achieved only by providing a virtual volume to the user without stopping I/O to/from the primary volume, and setting items for operating snapshots are simpler than those in the conventional backup, and furthermore, [the snapshot technology] has an advantage of enabling online-use of the past data of ballooning unstructured files, more users come to operate the snapshot technology frequently for the purpose of backup.

However, there has been a problem that, if a user creates multiple generations of snapshots for a long period of time such as for years and continues to operate the same, the amount of pre-update data retained in the differential volume explosively increases.

Therefore, overcoming this problem by allocating a large number of low bit-cost and low-speed storage devices to the differential volume can be considered, but this includes the problem of having a significant negative effect on the I/O performance to/from the primary volume.

That is, if there is a write access to the primary volume, the file server reads the pre-update data from the primary volume, writes this [data] to the differential volume, and then, writes the update data to the primary volume.

If a low-speed storage device is used for the differential volume, the speed of processing to write the pre-update data to the differential volume significantly slows down and, as a result, the performance of the I/O processing to/from the primary volume significantly degrades.

Therefore, a vendor of a file storage system has no choice but construct a differential volume with high bit-cost storages, and furthermore, eventually, the limit of the capacity of the differential volume is reached. Therefore, there is a problem that, from the beginning, operation of the snapshot function for backup reaches its limit sooner or later.

Therefore, the purpose of this invention is providing a storage apparatus and a snapshot control method for the same for preventing, even after long-term operation of snapshots as a means for backup, an increase in the amount of pre-update data retained in the differential volume.

Furthermore, another purpose of this invention is providing a storage apparatus in which, even if low bit-cost and low-speed storage devices are utilized as the differential volume for snapshots, the I/O performance to/from the in-use volume can be maintained; and a snapshot control method for the same.

Solution to Problem

In this invention, in order to achieve these purposes, snapshots utilizing pre-update data are replaced with snapshots utilizing update data so that the areas, in the differential volume, storing the pre-update data are released as free areas correspondingly, thereby avoiding accumulation of the pre-update data in the differential volume.

Furthermore, because no write of update data to the differential volume occurs even when the client computer performs an I/O to/from the in-use volume, even if a update data storing type differential volume is not configured with high-performance storage devices, this invention can provide the snapshot function to the user without negatively affecting the I/O processing performance of the storage apparatus.

Advantageous Effects of Invention

According to this invention, a storage apparatus for preventing, even after long-term operation of snapshots as a means for backup, an increase in the amount of pre-update data retained in the differential volume can be provided.

Furthermore, a storage apparatus in which, even if low bit-cost and low-speed storage devices are utilized as the volume for snapshots, the performance of I/O to/from the in-use volume can be maintained can be provided.

BRIEF DESCRIPTION OF DRAWINGS

FIG. 5 is a management table for managing pre-update data utilizing type snapshots.

FIG. 6A shows an initial state of the management table for the pre-update data utilizing type snapshots, in the process of registering virtual volumes.

FIG. 6B shows the above-mentioned management table showing the state following FIG. 6A.

FIG. 6C shows the above-mentioned management table showing the state following FIG. 6B.

FIG. 6D shows the above-mentioned management table showing the state following FIG. 6C.

FIG. 6E shows the above-mentioned management table showing the state following FIG. 6D.

FIG. 6F is the above-mentioned management table in which the registration of multiple virtual volumes has been achieved.

FIG. 7 is a block diagram showing an example of a snapshot operation system.

FIG. 8 is a block diagram illustrating management flags showing the types of virtual volumes.

FIG. 11 is a management table in which multiple virtual volumes belonging to the operation system in FIG. 7 have been registered, this management table managing snapshots using pre-update data saving type differential volumes.

FIG. 12 is a management table in which multiple virtual volumes belonging to the operation system in FIG. 7 have been registered, this management table managing snapshots using update data saving type differential volumes.

FIG. 13 is a pre-update data utilizing type snapshot management table after shifting the snapshot operation from the pre-update data utilizing type to the update data utilizing type.

FIG. 14A shows the state where replication volumes have been registered in the management table for snapshots utilizing update data.

FIG. 14B shows shift target bitmaps for shifting the management table for snapshots utilizing pre-update data to the update data.

FIG. 14C shows the state where, according to the shift target bitmaps, virtual volumes have been migrated from the snapshot management table utilizing pre-update data to the snapshot management table utilizing update data.

FIG. 14D shows the state where other virtual volumes also have been migrated to the virtual table in FIG. 14C.

DESCRIPTION OF EMBODIMENTS

Figure 1:
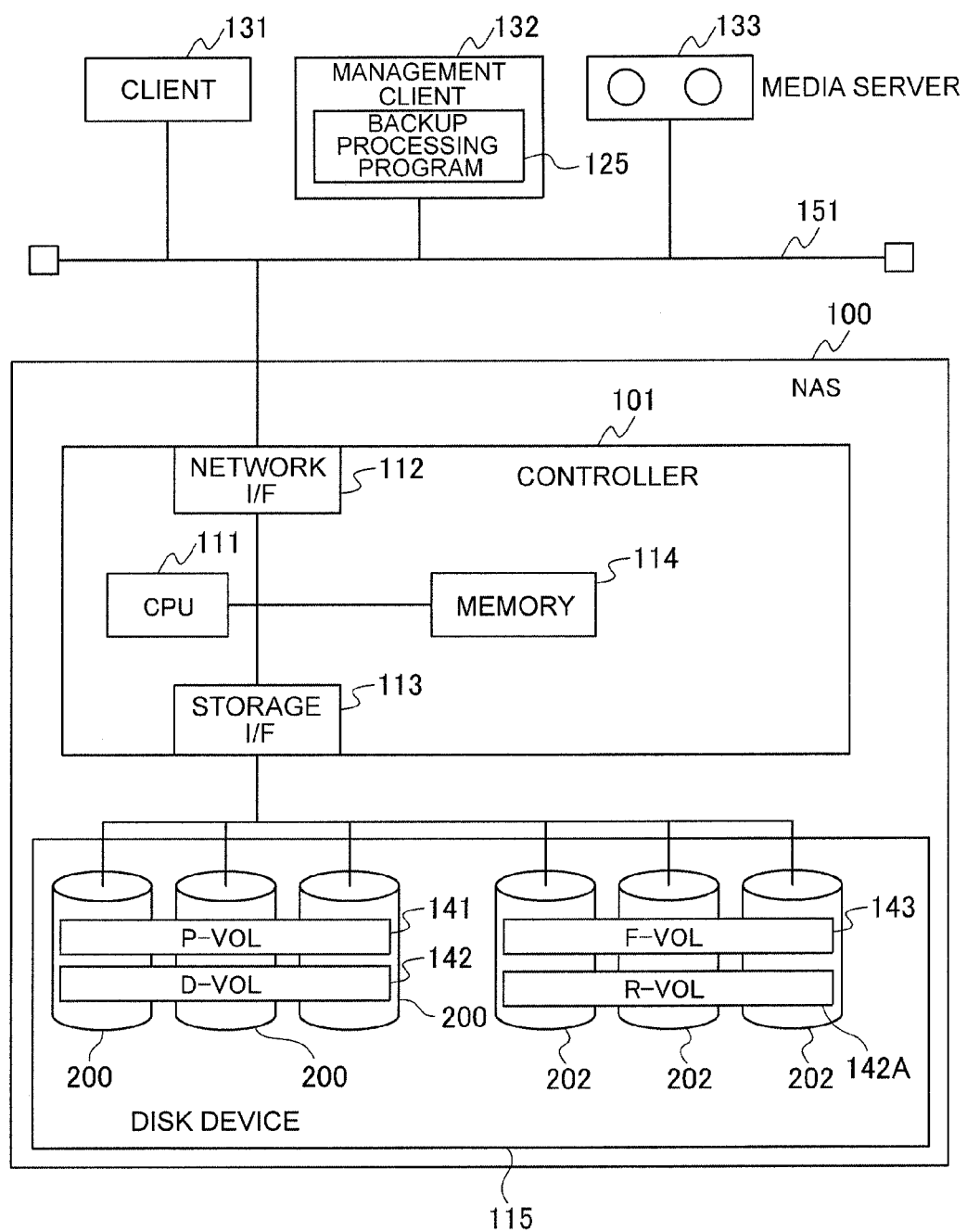
FIG. 1 is a hardware block diagram related to a first embodiment of the storage system according to this invention.

FIG. 1 is a hardware block diagram showing the first embodiment of the storage system using a storage apparatus according to this invention. This storage system has the configuration in which a client computer 131, a management client 132, and a media server 133 which are mutually connected as communicable with a network 151 are connected to a Network Attached Storage (NAS) apparatus 100. The network 151 establishes communications based on protocols such as TCP/IP, and transfers control signals and data among the devices connected to the network 151.

The client computer 131 is a computer device operated by a user, accesses the NAS 100, and performs data read and write. Multiple client computers 131 may be connected to the network 151. An example of the client computer is a host computer, a service server, or a PC client.

The management client 132 is a computer device operated by an administrator (administrative user) and is used for managing the NAS 100. This management client 132 includes at least a CPU, a memory, and an interface.

The media server 133 is a device for backing up data recorded in the NAS 100 to recording media such as tapes, and, for example, may be a magnetic tape device and may also be a large-capacity magnetic disk device.

The NAS 100 provides a file sharing service to the client computer 131. This NAS 100 is configured from a controller 101 and a disk device 115.

The disk device 115 includes multiple disk drives 200 and 202. In the disk device 115, files of which write is requested from the client computer 131 are partitioned in units of blocks and recorded.

The disk drives 200 are of a high-performance type and can achieve high-speed data read/write and, for example, compatible with Fibre Channel. Meanwhile, the disk drives 202 are low-performance and low bit-cost disk drives such as SATA.

A first RAID group is configured from multiple high-performance disk drives 200, for which a primary volume (hereinafter mostly abbreviated to a P volume or a P-VOL) 141 as an in-use volume which the client computer 131 accesses and a pre-update data storing differential volume (hereinafter also abbreviated to a D volume or a D-VOL) 142 for storing pre-update data when the P volume is updated, are set.

Then, a second RAID group is configured from multiple low-performance disk drives 202, for which a update data storing differential volume (hereinafter also abbreviated to an F volume or an F-VOL) 143 for storing update data to the P volume and a replication volume (hereinafter also abbreviated to an R volume or an R-VOL) 142A, are set. Note that the R volume 142A may alternatively be set in the RAID group configured from the disk drives 200.

The P volume 141 is an in-use volume which accepts I/O from the client computer 131, to which, in response to a write request from the client computer 131, data is written in units of blocks. Furthermore, in response to a normal read request from the client computer 131, data is read in units of blocks.

The controller 101 is configured from a CPU 111, a network interface (I/F) 112, a storage interface (I/F) 113, and a memory 114. The CPU 111 executes various types of programs stored in the memory 114 and provides the file sharing service and the snapshot function to the user.

Figure 2:
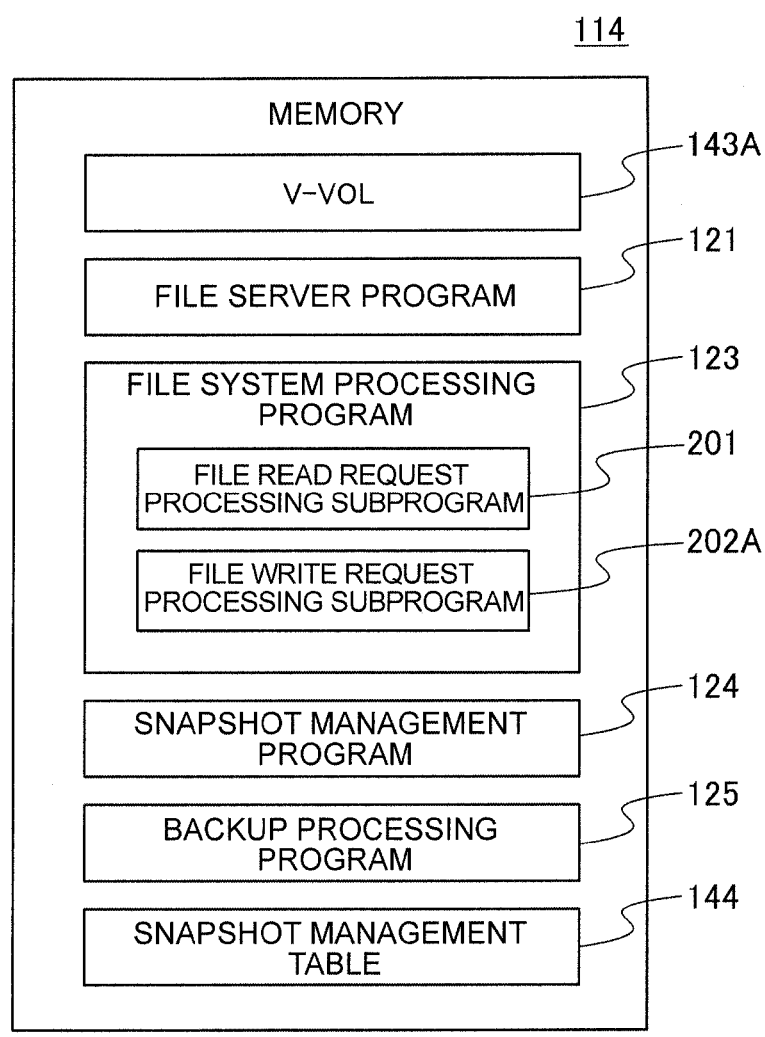
FIG. 2 is a function block diagram of a memory 114.

FIG. 2 is a function block diagram of the memory 114. The memory 114 includes a file server program 121, a file system processing program 123, a snapshot management program 124, a backup processing program 125, and a snapshot management table 144 which operate under the management of the NAS OS.

Furthermore, the memory 114 creates a virtual volume (V-VOL) 143A according to the volume manager program, and shows it as a snapshot volume to the user.

The virtual volume 143A is created for use access when the controller 101 receives a snapshot creation request from the client computer 131 or the management client 132, by freezing the data image of the primary volume 141 at that point in time and providing it to the user.

There are two types of snapshots the NAS 100 provides to the user; first [type] is a snapshot created utilizing the in-use data in the P volume 141 and pre-update data in the D volume 142; and second [type] is a snapshot created with the data in the R volume 142A of the P volume as of a specified point in time and update data in the F volume 143.

Hereinafter, for convenience, the former is referred to as a pre-update data utilizing type snapshot and the latter as an update data utilizing type snapshot. A replication volume is equivalent to a data image of the in-use volume as of a reference time recited in the claims.

To the D volume 142, the blocks recorded in the primary volume 141 at the time of copy-on-write of a snapshot are copied.

When the controller 101 receives a snapshot creation request from the client computer 131 or the management client 132, from that point in time on, when the blocks in the primary volume 141 are overwritten, the data before being overwritten (pre-update data) is copied to the D volume 142.

The controller 101 combines the blocks recorded in the primary volume 141 and the blocks recorded in the D volume 142, thereby restoring, as a snapshot, the data image of the primary volume 141 as of the point in time when [the controller 101] received a snapshot creation request.

The snapshot management table 144 include a table for pre-update data utilizing type snapshots (a management and control table for the D-VOLs, to which FIG. 5 described later corresponds) and a table for update data utilizing type snapshots (a management and control table for the F-VOLs, to which FIG. 12 described later corresponds).

For distinguishing the one from the other, the former is referred to as a "D volume management table" and the latter as an "F volume management table." Meanwhile, the term "snapshot management table" includes both of the above.

The snapshot management table 144 manages one or multiple snapshots for allowing the user to utilize the snapshots and, for each created snapshot, the correspondence relationships between the block address of the primary volume 141 or an R volume 142A and the block address of a differential volume (the D volume 142 or the F volume 143) is recorded. Hereinafter, the "snapshot management table 144" might also be simply referred to as a "management table 144."

In response to a data access request from the client computer 131, the file server program 121 requests the file system processing program 123 to execute read processing or write processing of files or directories, and sends execution results to the client computer 131 as the request source.

The file server program 121 executes user authentication and grants an access right to the user, thereby managing the file sharing in case where multiple users exist.

The file system processing program 123 includes at least a file read request processing subprogram 201 and a file write request processing subprogram 202A.

In response to a read request or a write request for a file or directory issued by the file server program 121 or the snapshot management program 124, the file system processing program 123, identifies the volume storing the file or the directory, the position and the size of the blocks to access, and issues a data read processing or a write processing to the snapshot management program 124.

Because the file system processing program 123 can utilize the information as of the point in time when a snapshot was created by accessing the virtual volume 143A, it can provide the snapshot image of the file system to the user computers such as the client computer 131 and the management client 132.

Figure 3:
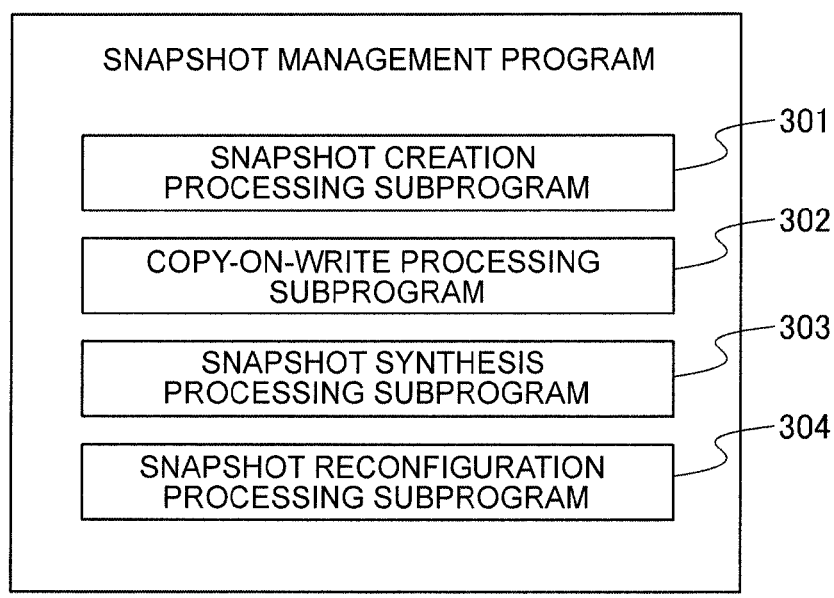
FIG. 3 is a detailed block diagram of a snapshot management program.

The snapshot management program 124 includes, as shown in FIG. 3, at least a snapshot creation processing subprogram 301, a copy-on-write processing subprogram 302, a snapshot synthesis processing subprogram 303, and a snapshot reconfiguration processing subprogram 304.

The snapshot creation processing subprogram 301 creates a snapshot of the P volume 141. Furthermore, [the subprogram 301] creates the virtual volume 143A so that the user can access the snapshot.

In response to a snapshot acquisition request from the client computer 131, the snapshot creation processing subprogram 301 sets an area for a virtual volume for the snapshot in the snapshot management tables 144, that is, for each of the D-VOL management table (FIG. 5) and the F-VOL management table (FIG. 12).

The client computer 131 can access, via the virtual volume 143A, the snapshot which is a frozen data image of the P volume as of a certain date and time.

The virtual volume 143A is virtual in itself to which no storage area is allocated. The P volume 141, the D volume 142, the F volume 143, and the R volume 142A are real volumes storing data related to snapshots.

The replication volume (R-VOL) 142A is a replicated volume of the P volume 141 as frozen at a certain point in time.

The copy-on-write processing subprogram 302 manages, using the snapshot management table 144, the D volume 142 storing pre-update differential data necessary for maintaining snapshots and the F volume 143 storing post-update differential data and, even when the data write processing is performed for the P volume in response to a request from the file system processing program 123, it executes the processing of maintaining the snapshots.

Specifically, when data is written to the P volume 141, [the subprogram 302] copies the pre-update data stored in the P volume 141 to the D volume 142, and updates the content stored in the P volume 141.

Furthermore, in order to make the data that had been stored in the P volume 141 accessible to the user after the creation of the snapshot, the copy-on-write processing subprogram 302 manages the data stored in the P volume 141 or the R volume 142A and the differential volume (the D volume 142, the F volume 143) so that the virtual volume 143A providing the created snapshot of the P volume 141 is accessible to the user device (131, 132).

Furthermore, as shown in the Japanese Unexamined Patent Application Publication No. 2004-342050, when there is a read from the host computer to the virtual volume, the copy-on-write processing subprogram 302 creates a bitmap for determining whether the read target data exists in the P volume 141 or in the D volume 142, and stores this [information] in the D volume management table 144 (FIG. 5).

Meanwhile, if the NAS 100 creates a snapshot for the client computer by utilizing update data, the snapshot synthesis processing subprogram 303 creates, when there is a read from the host computer to the virtual volume, creates a bitmap for determining whether the read target data exists in the R volume 142A or in the F volume 143, and stores this [information] in the F volume management table 144 (FIG. 12).

In accordance with the file system processing program 123 and the backup processing program 125, the snapshot synthesis processing subprogram 303 executes the read processing for the virtual volume 143A (that is, the processing for utilizing the snapshot).

Specifically, the snapshot synthesis processing subprogram 303 refers to the bitmap area in the D volume management table 144 (FIG. 5), determines from which to read data, the P volume 141 or the D volume 142, and provides, from the address of the determined volume, the data existed in the P volume 141 at the time of the snapshot creation request, to the file system processing program 123.

Meanwhile, similarly, the snapshot synthesis processing subprogram 303 refers to the bitmap area in the F volume management table 144 (FIG. 12), determines from which to read data, the R volume 142A or the F volume 143, and provides, from the address of the determined volume, the data existed in the P volume 141 at the time of the snapshot creation request, to the file system processing program 123.

The virtual volume 143A is visible as a snapshot as of a specified date and time to each of the user computers (131, 132, 133).

The snapshot reconfiguration processing subprogram 304 performs the processing of replacing the pre-update data utilizing type snapshot with the update data utilizing type snapshot. In the course of this processing, [the subprogram 304] also performs the processing of deleting the entry of the pre-update data utilizing type snapshot from the D volume management table (FIG. 5). [This processing,] by releasing the area storing the pre-update data in the D volume 142 as a free area, prevents capacity exhaustion of the D volume 142.

The snapshot reconfiguration processing subprogram 304 can perform this replacement of snapshot types without making the user computer aware of the replacement.

The snapshot synthesis processing subprogram 303 creates a snapshot by referring to the management table (FIG. 5) for the D volume 142 and the management table (FIG. 12) for the F volume 144.

When receiving a backup request designating a specified snapshot from the management client 132, the backup processing program 125 transfers, among the pieces of data recorded in the disk device 115, the data corresponding to the specified snapshot to the media server 133, and executes the backup processing for the snapshot as of the specified date and time.

Figure 4:
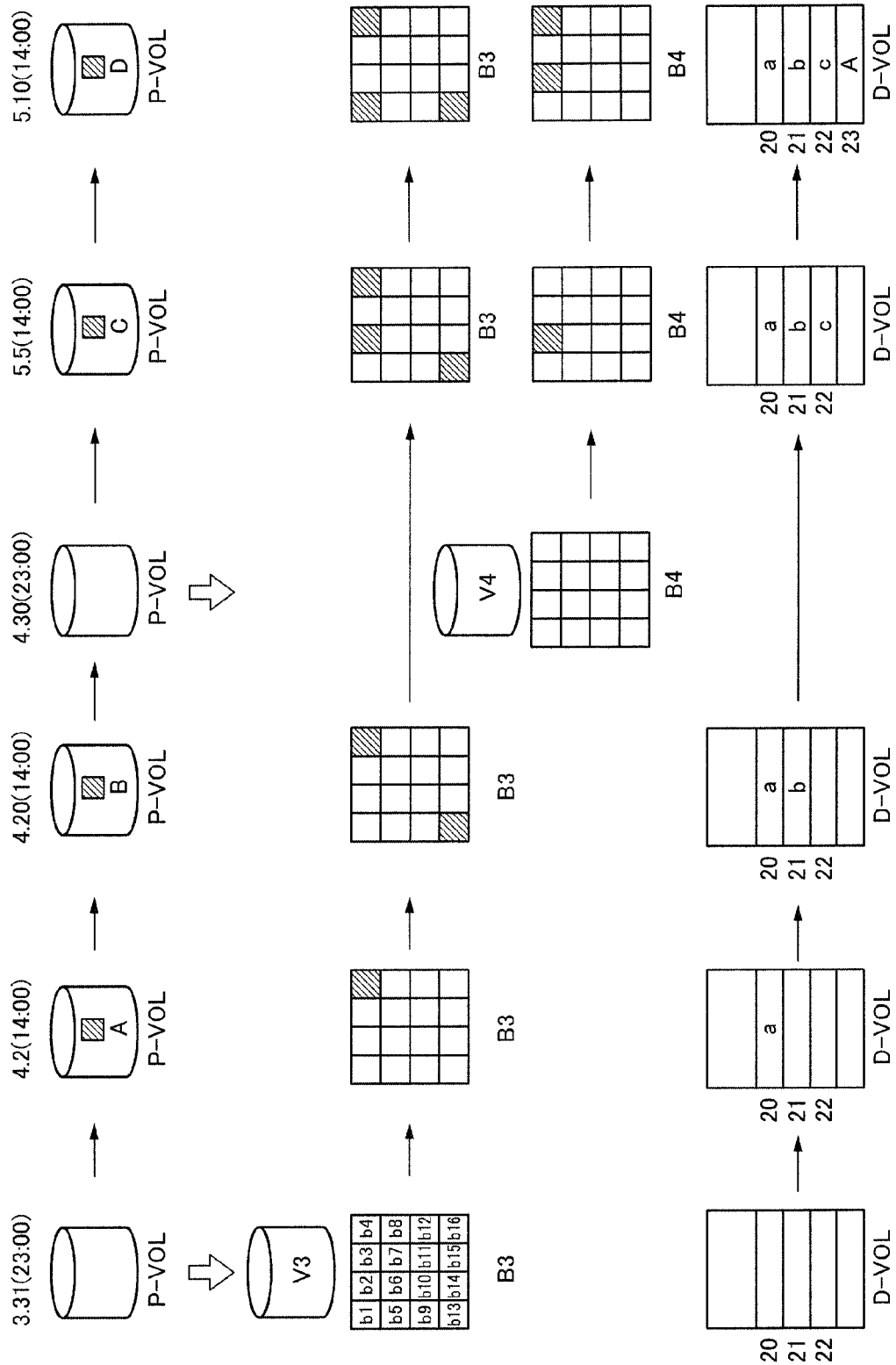
FIG. 4 is a block diagram illustrating the operation of the snapshot function in the storage apparatus.

Next, the operation of the pre-update data utilizing type snapshot function in the storage apparatus 100 in FIG. 1 is described with reference to FIG. 4. FIG. 4 illustrates a series of flow in which a snapshot V3 (virtual volume V3) was created at 23:00 on March 31; the P volume was updated on April 2 and on April 20 respectively; a snapshot V4 (virtual volume V4) was created at 23:00 on April 30; and the P volume 141 was updated on May 5 and on May 10.

FIG. 5 is described before describing FIG. 4. As described in the Japanese Unexamined Patent Application Publication No. 2004-342050, FIG. 5 is a snapshot management table for managing pre-update data utilizing type snapshots (D volume management table).

A column 511 in the snapshot management table corresponds to the block addresses in the P volume 141, a block address No. 0 of the P volume is assigned to a first row (first row) 501 which is the first line, a block address No. 1 of the P volume is assigned to a second row 502, a block address No. 2 of the P volume is assigned to a third row 503, the rest of the block addresses of the P volumes are sequentially assigned, and a block address No. (m−1) of the P volume is assigned to the last row 504.

Multiple virtual volumes 143A (513, 514, 515) are registered in the snapshot management table. Each of the virtual volumes corresponds to a snapshot created at a different date and time. Each of the blocks 511 in the P volume 141 corresponds to a block in the virtual volumes. A numeric value entered in each row of the virtual volume (501 to 504) is a segment address of the D volume 142.

A segment address No. "0" of the D volume is assigned to the first row of the virtual volume 1 (513) corresponding to the first snapshot, a segment address No. "1" of the D volume is registered in the second row, and "none" is set in the third row and the row m−1 as no segment of the D volume segment address has been assigned.

If the data of the block address No. 0 of the P volume 141 is updated, the copy-on-write processing program 302 writes the pre-update data of the block address No. 0 of the P volume to an unused segment address of the D volume 142, and writes this segment address to the block address No. 0 of the virtual volume 1. FIG. 5 shows an example in which "0" is registered as a segment address of the D volume 142.

Continued from the above, the segment address No. "1" assigned to the second row of the virtual volume 1 belongs to the D volume 142 and, when the data at the block address No. "1" of the P volume is updated, the pre-update data is written to the segment address No. "1" of the D volume.

Furthermore, continued from the above, "none" is registered in the third row of the virtual volume 1 corresponding to the block address No. 2 of the P volume and in the m-th row corresponding to the block address No. "m−1" of the P volume. "None" indicates that no write (update) is performed by the client computer to the block address No. 2, and No. (m−1) of the P volume.

It is already described above that the virtual volumes 2 (514), . . . n (515) respectively correspond to snapshots at specified points in time. If this is described with reference to FIG. 4, the virtual volume 2 (514) is a virtual volume V3 corresponding to the snapshot of March 31, and the virtual volume 1 is a virtual volume V4 corresponding to the snapshot of April 30. The virtual volume n (515) corresponds to the snapshot at the end of February or earlier.

The column 512 shows CoW bitmaps configured from multiple bit strings. b-1, b-2, ..., b-n in FIG. 5A are each bit strings. Each bit string corresponds to a virtual volume.

The bit string b-1 corresponds to the virtual volume 1, the bit string b-2 corresponds to the virtual volume 2, and the bit string b-n corresponds to the virtual volume n. Each bit in a bit string corresponds to each block address.

"0" in a bit string indicates that a corresponding block in the P volume 141 has been updated, and "1" indicates that the corresponding block in the P volume 141 has not been updated.

Next, the operation by the snapshot creation processing subprogram 301 to register information in the management table in FIG. 5 when creating a snapshot is described.

When the NAS 100 receives a request for creating a snapshot as of a certain date and time from the client computer, the snapshot creation processing subprogram 301 newly registers an entry of a virtual volume and an entry of a bit string corresponding to this virtual volume in the management table (FIG. 5). At this point in time, "none" is set for each block of the entry of the new virtual volume, and "1" is set for each block of the bit string.

Next, the operation by the NAS 100 performed when, after the registration of this virtual volume, there is a write from the host computer to the P volume 141 is described. In order to distinguish this virtual volume, that is, the snapshot created this time, from the virtual volume corresponding to the previously created snapshot, the former virtual volume is referred to as a "virtual volume (new)" and the latter virtual volume is referred to as a "virtual volume (old)."

When the copy-on-write processing subprogram 302 receives a write from the host computer to write in the P volume 141, it detects a block address, reads the pre-update data at this block address, and stores it in a free segment in the D volume 142.

Next, the copy-on-write processing subprogram 302 registers the number of the segment in the D volume in which the pre-update data has been stored, to the corresponding block in the virtual volume (new).

Furthermore, the copy-on-write processing subprogram 302 checks the corresponding block in the virtual volume (old) and, if determining that "none" is registered there, registers the number that was registered to the corresponding block in the virtual volume (new). Meanwhile, if [the subprogram 302] determines that a block number, not "none," has been registered, it maintains the number.

Furthermore, when the copy-on-write processing subprogram 302 registers the segment number of the D volume 142 to the block in the virtual volume (new), it sets the bit "1" of the corresponding block in the bit string corresponding to the virtual volume (new) to "0."

Next, the operation performed when the client computer makes a read access to a snapshot is described. The snapshot synthesis processing subprogram 303 determines the ID of the virtual volume which is the read target based on the read access, and refers to the bit string (e.g., b-1 in FIG. 5A) corresponding to this virtual volume.

Next, the snapshot synthesis processing subprogram 303 refers to the bit corresponding to the read target block in the virtual volume and, if determining that the bit is "0," acquires the segment number registered to the corresponding block in the virtual volume.

Next, [the program 303] accesses the D volume 142 according to this segment number, acquires the pre-update data of the P volume 141 as of the time of creating the snapshot, and transmits the same to the client computer.

Meanwhile, the snapshot synthesis processing subprogram 303 refers to the bit corresponding to the read target block in the virtual volume and, if determining that the bit is "1," accesses the corresponding block in the in-use volume 141, acquires the data of the P volume 141 at the time of creating the snapshot, and transmits the same to the client computer.

Instead of block addresses, block IDs may be utilized. The snapshot management table 144 (FIG. 5) is created and managed for each P volume. Note that, in a typical embodiment, on the condition that the block size is 512 bytes and the size of an in-use volume is 128 gigabytes, the number of blocks in the in-use volume is assumed to be 25000000. The maximum number of snapshots is assumed to be 64.

Next, with reference to FIG. 4, the operation for managing snapshots by utilizing pre-update data differential volumes (D volumes 142) is described in detail.

In FIG. 4, the V3 is a virtual volume providing the snapshot of 23:00 on March 31 to the user, and the V4 is a virtual volume providing the snapshot of 23:00 on April 30 to the user.

The example of the snapshot management table as of 23:00 on March 31 is shown in FIG. 6A. B3 in FIG. 4 is what the bit string b-1 is made into a map image. b1 to b16 respectively correspond to the "block addresses" 0 to 15 of the bit string b-1.

After creating the snapshot of 23:00 on March 31, when there is a write access (a→A) to the block "3" in the P volume 141 at 14:00 on April 2, the copy-on-write processing subprogram 302 reads the pre-update data (a) from the corresponding block "3" in the P volume, and stores the read data (a) in a free segment "20" in the D volume 142. A free segment in the D volume is acquired from a free queue managing this. The used block in the D volume is released from the free queue.

The management table at this point in time is as shown in FIG. 6B. That is, the copy-on-write processing subprogram 302 registers the segment address "20" of the D volume 142 to the block "2" of the virtual volume V3, and sets "0" to the block "2" of the bit string b-1.

Furthermore, when there is a write access (b→B) to the block "12" in the P volume 141 at 14:00 on April 20, the copy-on-write processing subprogram 302 reads the pre-update data (b) from the corresponding block "12" in the P volume, and stores the read data (b) in a free segment "21" in the D volume 142.

The management table at this point in time is as shown in FIG. 6C. That is, the copy-on-write processing subprogram 302 registers the segment address "21" of the D volume 142 to the block "12" of the virtual volume V3, and sets "0" to the block "12" of the bit string b-1.

FIG. 4 further shows that a snapshot is created on at 23:00 on April 30. V4 is a virtual volume corresponding to this snapshot. The management table at this point in time is as shown in FIG. 6D. In FIG. 6D, b-2 is a bit string corresponding to the virtual volume V4. B4 in FIG. 4 is a map image of the bit string b-2.

Next, after creating the snapshot of 23:00 on April 30 (virtual volume V4), when there is a write access (c→C) to the block "1" in the P volume 141 at 14:00 on May 5, the copy-on-write processing subprogram 302 reads the pre-update data (c) from the corresponding block "1" in the P volume, and stores the read data (c) in a free segment "22" in the D volume 142.

The management table at this point in time is as shown in FIG. 6E. That is, the copy-on-write processing subprogram 302 registers the segment address "22" of the D volume 142 to the block "1" of the virtual volume V4, and sets "0" to the block "1" of the bit string b-2.

In order to guarantee the user the snapshot of at 23:00 on March 31 (23:00), the copy-on-write processing subprogram 302 registers the segment address "22" of the D volume 142 also to the block "1" of the virtual volume V3, and sets "0" also to the block "1" of the bit string b-1.

Next, when there is a write access (A→D) to the block "3" in the P volume 141 at 14:00 on May 10, the copy-on-write processing subprogram 302 reads the pre-update data (A) from the corresponding block "3" in the P volume, and stores the read data (A) in a free segment "23" in the D volume 142.

The management table at this point in time is as shown in FIG. 6F. That is, the copy-on-write processing subprogram 302 registers the block address "23" of the D volume 142 to the block "3" of the virtual volume V4, and sets "0" to the block "3" of the bit string b-2.

After this, when the user makes a read access to the snapshot (virtual volume V3) as of the point in time 3. 31 (23:00), the snapshot synthesis processing subprogram 303 refers to the bit string b-1 in the management table (FIG. 6F), detects the read access to the block address "3," and confirms that the corresponding bit is "0."

Then, the snapshot synthesis processing subprogram 303 refers to the block address "3" of the virtual volume V3, confirms the segment address "20" of the D volume 142, reads the pre-update data "a" from the segment "20" in the D volume, and provides the same to the file system processing program 123.

Meanwhile, when the client computer 131 makes a read access to the snapshot (virtual volume V4) as of the point in time 4. 30 (23:00), the snapshot synthesis processing subprogram 303 refers to the bit string b-2 in the management table (FIG. 6F), detects the read access to the block address "3," and confirms that the corresponding bit is "0."

Then, the snapshot synthesis processing subprogram 303 refers to the block address "3" of the virtual volume V4, confirms the segment address "23" of the D volume 142, reads the pre-update data "A" from the segment "23" in the D volume, and provides the same to the file system processing program 123.

If the snapshot synthesis processing subprogram 303 determines, with reference to a bit string in the management table (FIG. 6F), that the bit being "1," it reads data from the P volume 141, and provides the same to the client computer 131.

As described above, in the first place, as compared to backup requiring full copy of in-use volumes, storing pre-update data in a D volume and creating a snapshot of an in-use volume (P volume 141) is a simple and convenient technology because it does not stop IO from a client computer 131 and, at the same time, does not have to be based on a backup plan, therefore, the snapshot function has been frequently used in place of backup.

For achieving the snapshot function, every time there is a write access from the client computer 131 to the P volume 141, the storage apparatus 100 writes pre-update data to the D volume configured from high-performance disk drives, thereby improving the response performance from the client computer 131 to the write access.

Meanwhile, if the NAS 100 operates the D volume for a long period for the purpose of continuing the snapshot function, an enormous amount of pre-update data is accumulated in the D volume, which significantly exhausts the capacity of the D volume.

Although expanding the capacity of the D volume can be considered, it increases a bit cost of the storage resources in the NAS server because the D volume is an expensive and high-performance device.

Meanwhile, replacing the D volume with a low bit-cost disk drive (this type of disk drive is inexpensive and therefore low-performance, and data write speed is extremely slow) significantly degrades the I/O performance for a P volume 141, and therefore, this cannot be applied.

In other words, because write to the P volume 141 is not complete until the pre-update data is read from the P volume 141 and written to the D volume 142, if a low-performance storage device is used for the D volume, the write to the D volume will be in a rate-determining step.

Therefore, the NAS 100 newly sets an update data storing type differential volume (F volume 143) for storing update data and creates snapshots on the basis of the update data so that the data accumulated in the D volume for a medium or long period of time can be released from the D volume 142 correspondingly, thereby preventing capacity exhaustion of the D volume.

Meanwhile, even if the capacity of the D volume which must be prepared in advance is small, there is no fear of the capacity exhaustion of the D volume due to accumulation of pre-update data. An F volume 143, which is for storing update data and is not accessed by the client computer 131 at the time of write, does not have to be as high-performance or expensive as a storage device for the D volume 142.

Next, related to providing snapshots to the user, an embodiment for shifting the differential volume management from the operation utilizing D volumes to the operation utilizing F volumes is described.

This operation is achieved according to a policy for shift, examples of the policy including that the shift processing is performed when the capacity utilization of the D volume 142 exceeds a specified threshold; the shift processing is performed when the number of snapshot volumes exceeds a predetermined threshold; or that the shift processing is performed at the end of each fiscal year for the snapshot volumes of the year.

Note that, if the storage administrative user shifts the operation of the snapshot function from the operation based on the D volume 142 to the operation using the F volume 143, it is preferable to maintain the operation of a latest snapshot in the D volume from the perspective of the management of the shift processing.

FIG. 7 is a block diagram showing an embodiment of the shift from the operation of the snapshot function using a D volume to the operation using an F volume. V3 to V6 are respectively snapshot volumes (virtual volumes) as of specified points in time (stated in FIG. 7).

In order to create a frozen volume which is a base for determining update data to be stored in the F volume 143, the snapshot reconfiguration processing subprogram 304 creates, as a frozen volume, a replication volume (R-VOL) 142A from the virtual volume V3 (S2 of FIG. 7).

Note that an R-VOL may also be configured with the backup of a P-VOL. The snapshot reconfiguration processing subprogram 304 changes the snapshot volume of Mar. 30, 2009, from the virtual volume V3 to the R-VOL.

In order to be able to create a snapshot volume on the basis of the F-VOL and the R-VOL, after creating an F volume management table (FIG. 12), the snapshot reconfiguration processing subprogram 304 releases the assignment of the P-VOL and the D-VOL to the virtual volume V4 and the virtual volume V5 (S8, S9, S12, S13), and assigns the F-VOL and the R-VOL to these virtual volumes (S6, S7, S10A, S11).

In order to prevent degradation of the response performance for write access from the host computer 131 while maintaining the snapshot function, the NAS 100 maintains the operation of a latest virtual volume V6 utilizing the P-VOL and the D-VOL (R1, R2).

Next, the processing of shifting the operation using the D volume to the operation by using the F volume is described in details. This processing is mainly achieved by the snapshot reconfiguration processing subprogram 304.

Figure 9:
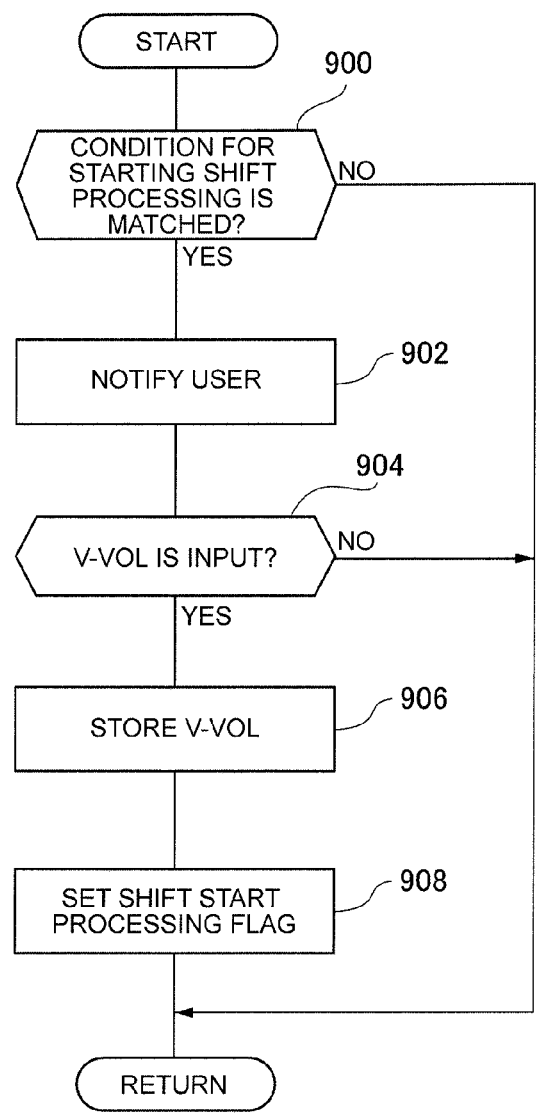
FIG. 9 is a flowchart for determining the start of the processing of shifting from the snapshot operation using a pre-update data saving type differential volume to [the operation] using an update data saving type differential volume.

The snapshot reconfiguration processing subprogram 304 firstly performs the flowchart of FIG. 9. This flowchart is for determining whether to start the shift processing or not. The snapshot reconfiguration processing subprogram 304 checks whether or not the environment of a snapshot matches a condition for starting the shift processing (900). This condition is, as described above, for example, a decrease in the unused area of the D volume 142.

If the snapshot reconfiguration processing subprogram 304 determines that the condition is matched, it notifies the storage management terminal of that determination (902). The management terminal prompts the storage administrator to make an input for the shift processing. Note that a request for changing the operation may be made to the management client 132 and an input for changing the operation may be made to the management client 132. This input is an input for specifying the virtual volume to which the shift processing is applied. In light of FIG. 7, the virtual volume V3, the virtual volume V4, the virtual volume V5, and the virtual volume V6 are input to the storage management terminal (904).

As described above, even if the latest virtual volume is input, the snapshot reconfiguration processing subprogram 304 does not make it as a shift target. Therefore, input of the virtual volume V6 may be omitted.

Next, the snapshot reconfiguration processing subprogram 304 stores the input IDs of the virtual volumes and the shift processing start flag in a predetermined area in the memory 11 (908).

If there is no shift target virtual volume, the snapshot reconfiguration processing subprogram 304 makes a negative determination at the step 904, and terminates the flowchart of FIG. 9. The snapshot reconfiguration processing subprogram 304 repeats this flowchart at predetermined time intervals.

Note that the storage administrator may select a shift processing target virtual volume and set a shift processing start flag without following the flowchart shown in FIG. 9.

Figure 10:
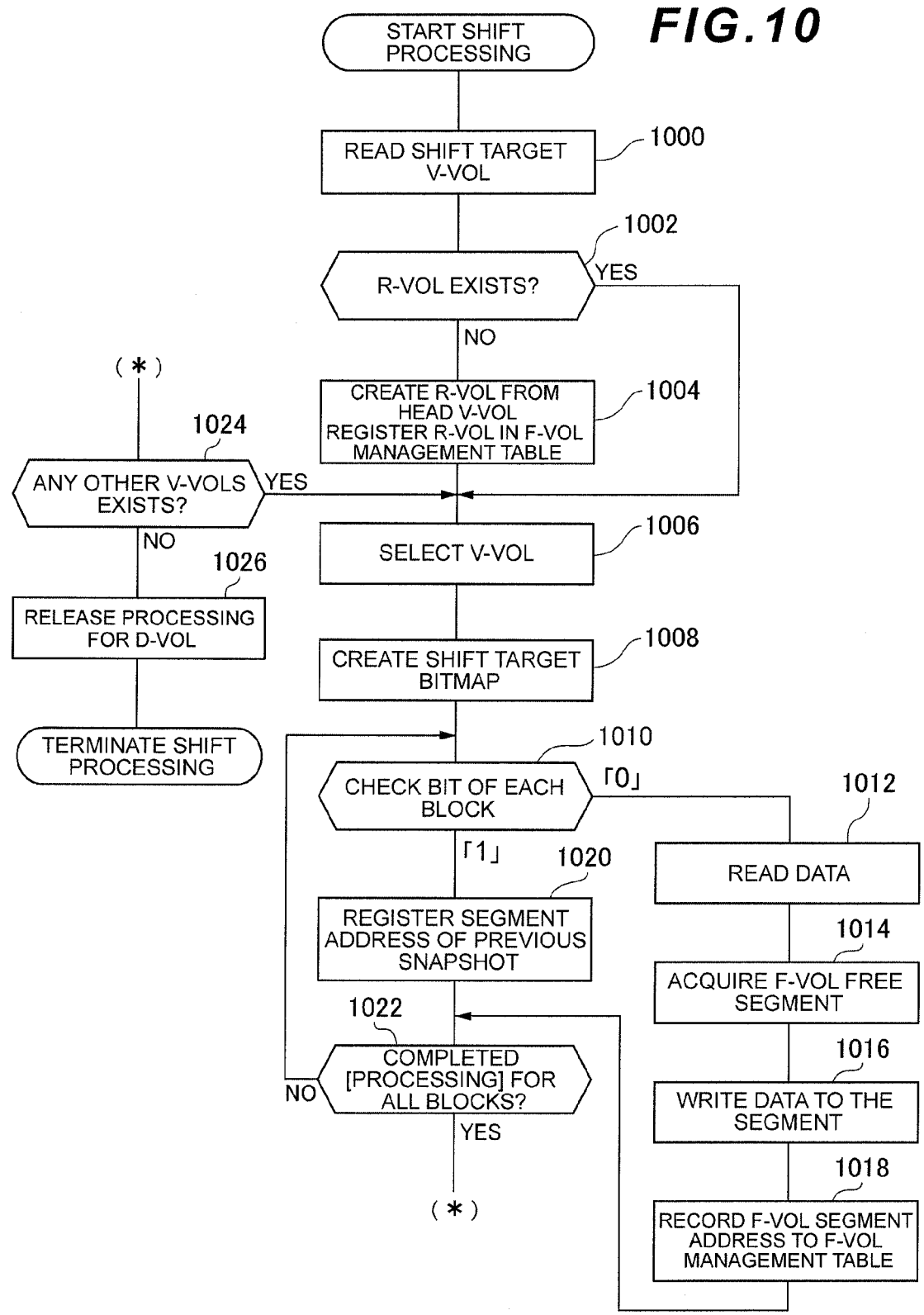
FIG. 10 is a flowchart showing the details of the shift processing referred to in the description of FIG. 9.

FIG. 10 is a flowchart showing the details of the shift processing. The snapshot reconfiguration processing subprogram 304 refers to a shift processing start flag at predetermined time intervals and, if determining that a shift start flag is set, starts the flowchart of FIG. 10. Note that the snapshot reconfiguration processing subprogram 304 resets the flag when it completes the flowchart of FIG. 10.

The snapshot reconfiguration processing subprogram 304 reads the identification number of the virtual volume (V-VOL) registered as the shift target in the memory 114 (1000).

Next, [the snapshot reconfiguration processing subprogram 304] determines whether an R volume 142A is registered in the RAID group or not and, if it is not registered, creates an R volume from the oldest virtual volume (S1 of FIG. 6), and registers the R volume in the F-VOL management table (1004).

Referring to FIG. 6, the head virtual volume is V3. If an R volume exists, the snapshot reconfiguration processing subprogram 304 skips the step 1004.

The snapshot reconfiguration processing subprogram 304 reads data from all the blocks in the virtual volume V3, and copies the data to the respective corresponding blocks in the R volume (S2).

The snapshot reconfiguration processing subprogram 304 refers to the bit string b-1 corresponding to the virtual volume V3 in the D volume management table shown in FIG. 6F, and reads the data from the P-VOL or the D-VOL (S3, S4).

Next, the snapshot reconfiguration processing subprogram 304 selects the virtual volume V4 which is of the generation next to the head virtual volume (1006), and performs the shift processing to this virtual volume. This processing is more specifically described below.

FIG. 11 is an example of the D-VOL management table for the virtual volumes from V3 to V6 in FIG. 7. How to see this table is the same as that for the above-mentioned FIG. 6F. That is, the numeric value in each block of each virtual volume is a segment address of the D volume.

Meanwhile, FIG. 12 is an F volume management table as of the time of terminating the shift processing, and FIG. 13 is a D volume management table as of the time of terminating the shift processing. The virtual volume V3 is registered in the F volume management table (FIG. 12) as a real volume (R-VOL) which does not require reference to the F volume 143.

In FIG. 12, the address of each block in the virtual volume V4 (using the F-VOL) and the virtual volume V5 (using the F-VOL) indicates a segment address of the F volume storing update data for the P volume 141.

"None" indicates that the snapshot synthesis processing subprogram 303 does not refer to the F-VOL but refers to the R-VOL when creating a snapshot.

When the shift processing is complete, the D volume management table (FIG. 11) as of the point in time before starting the shift processing is changed as shown in FIG. 13. That is, the snapshot reconfiguration processing subprogram 304 deletes the entries of the virtual volumes from V3 to V5 from the management table.

Back to the flowchart of FIG. 10, the explanation is continued. At the step 1004, the snapshot reconfiguration processing subprogram 304 registers the R-VOL, in place of the virtual volume V3, in the F volume management table. The management table in this state is as shown in FIG. 14A.

Next, the snapshot reconfiguration processing subprogram 304 selects the virtual volume V4 to follow the virtual volume V3 (1006), and creates a shift target bitmap (1008).

The shift target bitmap is required for the snapshot reconfiguration processing subprogram 304 to determine whether or not to register update data for the P volume in the F volume.

In FIG. 14B, BA1 is a shift target bitmap for changing [the type of] the virtual volume V4 from the type utilizing the D volume to the type utilizing the F volume, and BA2 is a shift target bitmap for shifting the type of the virtual volume V5 from the type utilizing the D volume to the type utilizing the F volume. Note that the D volume management table shown in FIG. 11 is shown in FIG. 14B for reference, with a reference sign 500.

In this bitmap, "1" indicates that no update data is to be registered in the F volume, and "0" indicates that update data is to be registered in the F volume.

When the snapshot reconfiguration processing subprogram 304 creates a shift target bitmap, in order to determine whether the P volume is updated or not, it refers to the shift target virtual volume and the virtual volume previous to the shift target virtual volume, and compares the values for the same block address.

To describe with reference to FIG. 14B, when the snapshot reconfiguration processing subprogram 304 creates a shift target bitmap BA1 for the virtual volume V4, it compares, in order to determine whether or not the P-VOL has been updated after setting the virtual volume V3, the shift target virtual volume V4 and the virtual volume V3 previous to the virtual volume V4, and compares the values for the same block address. This is because the values of the same block address change if there is an update.

As for the block address 0, because no D volume segment address is set for either of the virtual volumes, "1" is set for the block address 0 of the shift target bitmap BA1. As for the block address 1, because both of the virtual volumes have the same value, likewise, "1" is set for the block address 1 of BA1.

As for the block address 3, the snapshot reconfiguration processing subprogram 304 determines that, because the values of both of the virtual volumes are different, the P volume has been updated and, as a result of that, the segment address of the D volume storing the pre-update data became different; and sets "0" to the block address 3 of the shift target bitmap BA1.

As for the block address 12, because the segment address of the D volume is set for the virtual volume V3 and not for the virtual volume V4, the snapshot reconfiguration processing subprogram 304 sets "0" to the block address 12 of the shift target bitmap BA1.

Furthermore, the snapshot reconfiguration processing subprogram 304 compares the virtual volume V4 with the virtual volume V5 and, as shown in FIG. 14B, creates a shift target bitmap BA2 for the virtual volume V5. The snapshot reconfiguration processing subprogram 304 stores the shift target bitmap in a predetermined area of the memory 114.

The snapshot reconfiguration processing subprogram 304, creates the shift target bitmap BA1 for the virtual volume V4 at the step 1008 as described above; and checks, by referring to the same, the values of the respective block addresses of the bitmap from the top (1010).

If a bit value is "0," the snapshot reconfiguration processing subprogram 304 performs the steps from 1012 to 1018 and, if [the bit value is] "1," performs the step 1020, [the subprogram 304] applies either of the steps to all the bits. The F volume management table acquired through this series of processing is as shown in the above-mentioned FIG. 12.

For example, because the bit of the block address "3" of the shift target bitmap BA1 (FIG. 14B) is "0," the snapshot reconfiguration processing subprogram 304 reads, at the step 1012, the content at the segment address "23" of the D volume, (the address being indicated) in the block address "3" of the virtual volume V4.

Then, the snapshot reconfiguration processing subprogram 304 acquires a free segment of the F volume (e.g. "63") from a free queue, writes the data that has been read at the step 1012 at this segment address (1016, S5A in FIG. 6), and registers the segment address "63" to the block address "3" of the virtual volume V4 (using the F-VOL).

The data registered to the segment address "63" of the F volume is the data updated between the virtual volume V3 and the virtual volume V4 for the P volume 141.

Furthermore, for example, because the bit of the block address "12" of the shift target bitmap is "0," the snapshot reconfiguration processing subprogram 304 refers to the block address "12" of the virtual volume V4 (FIG. 14B).

Because "none" is registered to this [address], the snapshot reconfiguration processing subprogram 304 reads data from the same block address in the P volume, writes this to a free segment "64" in the F volume (S5 in FIG. 6), and registers the segment address "64" to the block address "12" of the virtual volume V4 (using the F-VOL) (FIG. 14C).

Meanwhile, because "1" is registered to the block addresses other than "3" and "12" in the shift target bitmap BA1, the snapshot reconfiguration processing subprogram 304 registers, to these block addresses, the same values as what is registered to the same blocks of the R volume which is the snapshot volume previous to the virtual volume V4 (using the F-VOL).

As shown in FIG. 14C, because no segment address of the F volume is registered to any block address of the R volume, "none" is registered to the block addresses other than "3" and "12 of the virtual volume V4 (using the F-VOL).

Then, when the snapshot reconfiguration processing subprogram 304 completes the above-mentioned processing for all the bits in the shift target bitmap V4, it refers to the value of each block of the virtual volume V4 (using the F-VOL); registers "0" to the block addresses of the bit string b-2 in the Cow bitmap, to which block addresses segment addresses of the F volume having been registered; and registers "1" to the block addresses in the bit string b-2, to which the block addresses no segment address of the F volume having been registered. The state of the F volume management table at this point is as shown in FIG. 14C.

As described above, the bitmap in FIG. 12 is a bitmap for referring to the F volume, and the bitmap in FIG. 11 is a bitmap for referring to the D volume.

Note that the processing of registering "0" or "1" to each bit in the bit string for the F volume may be performed each time the processing of determining whether or not to register a segment address of the F volume to each block of the shift target bitmap V4 is performed. Thus, the snapshot reconfiguration processing subprogram 304 completes the shift processing for the virtual volume V4.

Next, the snapshot reconfiguration processing subprogram 304 makes a positive determination at the step 1022, then, because the shift processing for the virtual volume V5 is not complete, makes a positive determination at the step 1024 as there is still another virtual volume, returns to the step 1006, and executes, based on the shift target bitmap (for the V5), the steps from 1012 to 1022 in the same way as with the shift processing for the virtual volume V4 while making a comparison to the virtual volume V4 (using the F-VOL). The F volume management table acquired as a result of this is shown in FIG. 14D.

Next, the snapshot reconfiguration processing subprogram 304 makes a positive determination at the step 1022, then, determines that the shift processing is complete for all the virtual volumes, in other words, makes a negative determination at the step S1024, and proceeds to the step 1026.

The snapshot reconfiguration processing subprogram 304 deletes the entries of the virtual volumes from V3 to V5 from the D volume management table (FIG. 11). As a result, the above-mentioned table becomes as shown in FIG. 13. Furthermore, [the program 304] releases the used segment addresses of the D volume included in the deleted entries unless they are registered to the block addresses of the other virtual volumes registered in the D volume management table.

This release is achieved by connecting the used segment addresses to free queues. Therefore, even if the capacity of the D volume is limited, pre-update data utilized for the snapshot volume V6 can be completely protected and maintained.

Through these steps, the snapshot reconfiguration processing subprogram 304 completes the flowchart related to FIG. 10.

Figure 15:
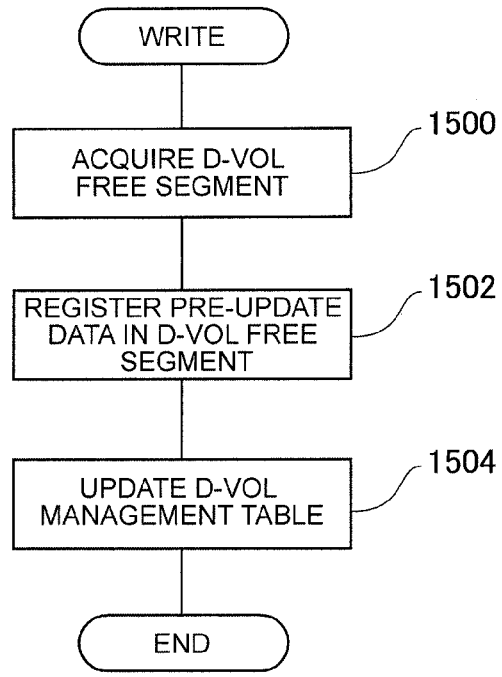
FIG. 15 is a flowchart of the processing by the storage apparatus to process a write command from the client computer after the snapshot management has been shifted to the operation utilizing update data.

Next, FIG. 15 shows a flowchart performed when write from the host computer 131 is applied (WR1 in FIG. 7) to the P volume 141.

The copy-on-write processing subprogram 302 acquires a free segment in the D-VOL (1500), reads pre-update data existing at a specified block address of the P-VOL for which write was performed, and stores the same in a free segment of the D-VOL (1502, WR2 in FIG. 7).

Then, the copy-on-write processing subprogram 302 registers the address of the free segment of the D-VOL volume to a specified block address of the virtual volume V6 in the D volume management table (FIG. 13), and sets "0" to a corresponding bit in the D volume bit string for the virtual volume V6 (1504). Thus, the flowchart of FIG. 15 is complete.

Note that, as described above, because the operation of the snapshot function for the virtual volumes V3 to V5 has been shifted from the operation utilizing the D volume to the operation utilizing the F volume, the entries of these virtual volumes are deleted from the D volume management table, as shown in FIG. 13.

Figure 16:
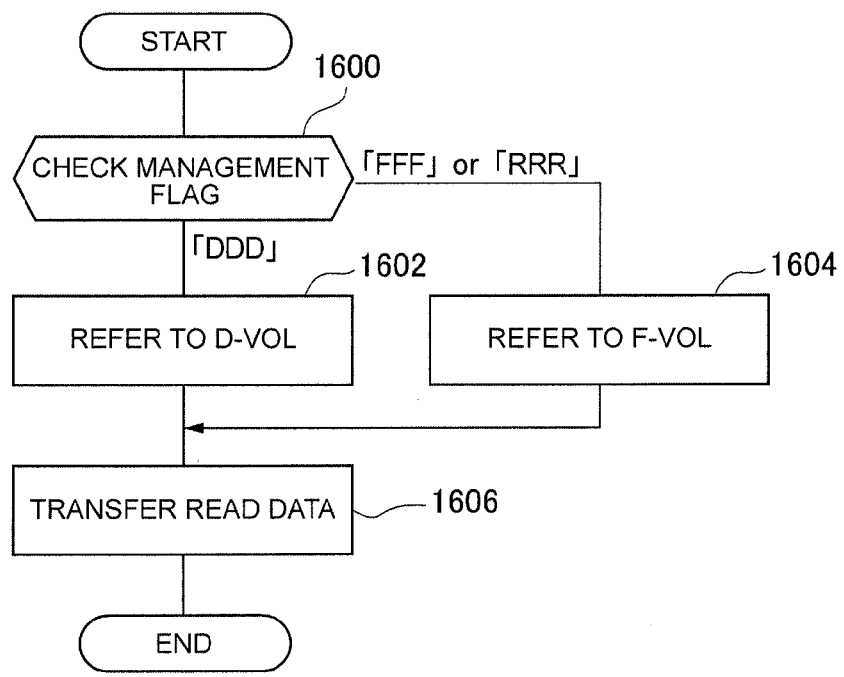
FIG. 16 is a flowchart describing the processing by the storage apparatus to perform read for a snapshot volume after the snapshot management has been shifted to the operation utilizing update data.

FIG. 16 shows a flowchart performed when a read request is made from the host computer 131 to the snapshot volume.

FIG. 8 is a snapshot volume management table in which multiple attributes of multiple snapshot volumes are recorded. "RRR" is an attribute flag indicating [that the volume] is an R volume (real volume), "FFF" is an attribute indicating that a difference, as update data, is managed in the F volume, and "DDD" is an attribute indicating that a difference, as pre-update data, is managed in the D volume.

The snapshot creation processing subprogram 301, at the point in time of creating a snapshot volume, registers the snapshot volume with an attribute in the management table, and further, every time the snapshot reconfiguration processing subprogram 304 changes the operation mode of snapshot volume from the operation mode utilizing the D volume to the operation mode utilizing the F volume, it updates the attributes of the volume.

The snapshot creation processing subprogram 301 refers to this management table, checks the attribute of a snapshot volume as a target for read from the host computer and, if the attribute is either "RRR" or "FFF," it creates a snapshot utilizing the F volume and provides the same to the host computer (1604) while, if [the attribute is] "DDD," creates a snapshot utilizing the D volume (1602).

If the snapshot creation processing subprogram 301 creates a snapshot utilizing the F volume, it refers to the F volume bit string corresponding to the virtual volume as the read target in the F volume management table (FIG. 12).

If the value of the bit corresponding to the block address as the read target is "1," [the subprogram 301] reads the data from the corresponding block in the R volume and provides it to the host computer 131 (1606).

Meanwhile, if [the value is] "0," [the subprogram 301] identifies the virtual volume as the read target in the management table (FIG. 12) and, for the block as the read target of this virtual volume, acquires the segment address of the F volume. Then, the snapshot synthesis processing subprogram 303 accesses the F volume, and provides the update data registered at this segment address to the host computer (1606).

Furthermore, if the snapshot volume (R-VOL) as the target for read from the host computer 131 is of the attribute "RRR," the snapshot synthesis processing subprogram 303 refers to the F volume management table (FIG. 12) (1604) and, because the values of all the bits in the bit string assigned to the R-VOL are NULL, reads the data directly from the corresponding block addresses in the R volume and provides it to the host computer (S1606).

Note that, although the above-mentioned embodiment has been described for the case where the storage apparatus is a NAS, a configuration in which [the storage apparatus] is separated from the file server may also be employed.

INDUSTRIAL APPLICABILITY

This invention can prevent an increase in the amount of pre-update data retained in a differential volume even after long-term operation of snapshots as a means for backup.

REFERENCE SIGN LIST 100 storage apparatus (NAS)
101 controller
114 memory
115 disk device
131 client computer
141 primary volume (in-use volume)
142 pre-update data storing type differential volume
143 update data storing type differential volume

The invention claimed is:
1. A storage apparatus for providing a data storage service to a user computer, comprising:
 a controller for setting an in-use volume which is continuously accessed by the user computer and also setting a first snapshot and a second snapshot for the in-use volume,
 wherein the controller:
 creates the first snapshot on the basis of the in-use volume and a first differential volume that stores, as differential data, pre-update data of the in-use volume; and
 creates the second snapshot on the basis of a data image of the in-use volume as of a reference time and a second differential volume that stores, as differential data, update data of the in-use volume.
2. The storage apparatus according to claim 1, wherein the controller:
 when a write access is made from the user computer to the in-use volume, stores the pre-update data of the in-use volume in the first differential volume;
 then, stores update data accompanying the write access in the in-use volume;
 locates an access position of the access from the user computer to the first snapshot;
 refers to management information for managing one or more positions in the in-use volume where the update data has been stored and, if determined that the access position corresponds to a position in the in-use volume where the update data has been stored, reads the pre-update data from the first differential volume and provides it to the user computer, meanwhile, if determined that the access position is an area where no update data has been stored, reads data from the in-use volume and provides it to the user computer;
 creates a data image of the in-use volume as of a reference time;
 stores, in the second differential volume, update data for the in-use volume that has been made between the reference time and a setting time of the second snapshot;
 locates an access position of the access from the user computer to the second snapshot;
 refers to management processing information for managing one or more positions in the in-use volume where the update data has been stored and, if determined that the access position corresponds to a position in the in-use volume where the update data has been stored, reads the pre-update data from the second differential volume and provides it to the user computer, meanwhile, if determined that the access position is an area where no update data has been stored, reads data from the data image and provides it to the user computer;

sets a plurality of generations of snapshots as the first snapshot;

sets, as the management information, first management information for a first generation snapshot from among the plurality of generations of snapshots;

sets, as the management information, second management information for a next generation snapshot following the first generation;

creates, on the basis of the first management information and the second management information, the management processing information indicating one or more update positions in the in-use volume for updates made between the setting of the first generation snapshot to the setting of the next generation snapshot;

creates, from the first generation snapshot, a replication volume for the in-use volume, as a data image of the in-use volume as of a reference time;

defines the second snapshot as a snapshot that is set at a setting time of the next generation snapshot;

deletes the next generation snapshot; and releases, of storage areas in the first differential volume, one or more areas storing the pre-update data used for the next generation snapshot, as free areas, and wherein the first differential volume is set in a Redundant Array of Independent Disks (RAID) group configured from a plurality of high-performance disk devices and the second differential volume is set in a RAID group configured from a plurality of general-purpose, low-bit cost disk devices.

3. The storage apparatus according to claim 1, wherein the controller having set the first snapshot:

when a write access is made from the user computer to the in-use volume, stores the pre-update data of the in-use volume in the first differential volume;

then, stores update data accompanying the write access in the in-use volume;

locates an access position of the access from the user computer to the first snapshot; and refers to management information for managing one or more positions in the in-use volume where the update data has been stored and, if determined that the access position corresponds to a position in the in-use volume where the update data has been stored, reads the pre-update data from the first differential volume and provides it to the user computer, meanwhile, if determined that the access position is an area where no update data has been stored, reads data from the in-use volume and provides it to the user computer.

4. The storage apparatus according to claim 3, wherein the controller sets a plurality of generations of snapshots as the first snapshot, and sets the management information for each generation snapshot.

5. The storage apparatus according to claim 4, wherein the controller creates the replication volume from one of the plurality of generations of snapshots.

6. The storage apparatus according to claim 3, wherein the controller having set the second snapshot:

creates a data image of the in-use volume as of a reference time;

stores, in the second differential volume, update data for the in-use volume that has been made between the reference time and a setting time of the second snapshot;

locates an access position of the access from the user computer to the second snapshot; and refers to management processing information for managing one or more positions in the in-use volume where the update data has been stored and, if determined that the access position corresponds to a position in the in-use volume where the update data has been stored, reads the pre-update data from the second differential volume and provides it to the user computer, meanwhile, if determined that the access position is an area where no update data has been stored, reads data from the data image and provides it to the user computer.

7. The storage apparatus according to claim 6, wherein the controller:

sets a plurality of generations of snapshots as the first snapshot;

defines the second snapshot as one for replacing a part of the plurality of generations of snapshots;

deletes the part of the plurality of generations of snapshots that has been replaced by the second snapshot; and releases, of storage areas in the first differential volume, one or more areas storing the pre-update data used for the deleted snapshots, as free areas.

8. The storage apparatus according to claim 7, wherein the first differential volume is set in a Redundant Array of Independent Disks (RAID) group configured from a plurality of high-performance disk devices and the second differential volume is set in a RAID group configured from a plurality of general-purpose, low-bit cost disk devices.

9. The storage apparatus according to claim 6, wherein the controller:

sets a plurality of generations of snapshots as the first snapshot;

sets, as the management information, first management information for a first generation snapshot from among the plurality of generations of snapshots;

sets, as the management information, second management information for a next generation snapshot following the first generation;

creates, on the basis of the first management information and the second management information, the management processing information indicating one or more update positions in the in-use volume for updates made between the setting of the first generation snapshot to the setting of the next generation snapshot;

creates, from the first generation snapshot, a replication volume for the in-use volume, as a data image of the in-use volume as of a reference time;

defines the second snapshot as a snapshot that is set at a setting time of the next generation snapshot;

deletes the next generation snapshot; and releases, of storage areas in the first differential volume, one or more areas storing the pre-update data used for the next generation snapshot, as free areas.

10. The storage apparatus according to claim 1, wherein the controller having set the second snapshot:

creates a data image of the in-use volume as of a reference time;

stores, in the second differential volume, update data for the in-use volume that has been made between the reference time and a setting time of the second snapshot;

locates an access position of the access from the user computer to the second snapshot; and refers to management processing information for managing one or more positions in the in-use volume where the update data has been stored and, if determined that the access position corresponds to a position in the in-use volume where the update data has been stored, reads the pre-update data from the second differential volume and provides it to the user computer, meanwhile, if determined that the access position is an area where no update data has been stored, reads data from the data image and provides it to the user computer.

11. The storage apparatus according to claim 10, wherein a data image of the in-use volume as of a reference time is made from a replication volume of the in-use volume.

12. The storage apparatus according to claim 1, wherein the controller sets a plurality of generations of snapshots, a past generation snapshot is configured from the second snapshot, and a subsequent generation snapshot is configured from the first snapshot.

\* \* \* \* \*